April 3, 1962  E. B. NOLT ETAL  3,027,825
SAFETY DEVICE FOR TIER NEEDLES
Filed Dec. 16, 1960  2 Sheets-Sheet 1
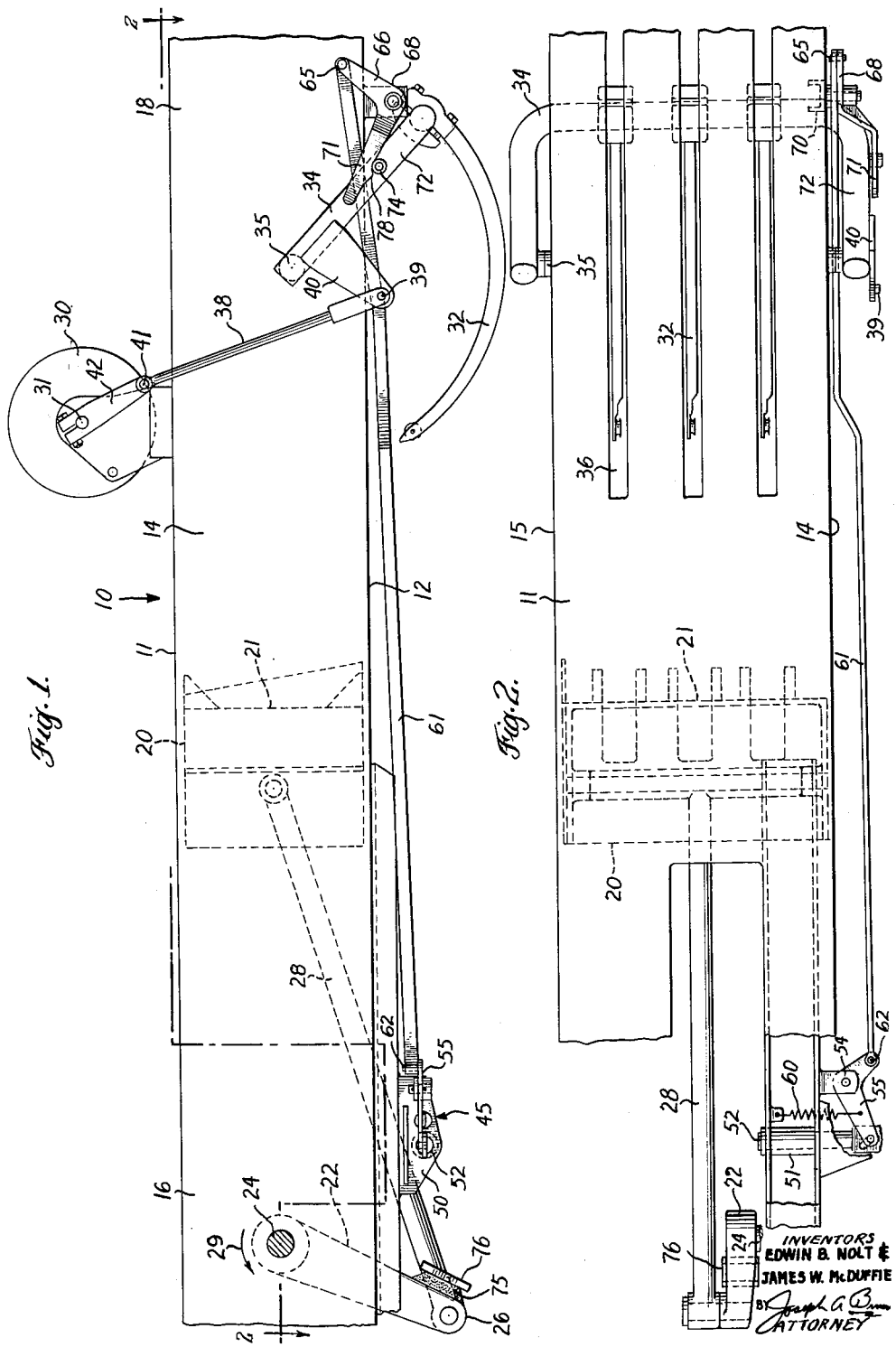
INVENTORS
EDWIN B. NOLT &
JAMES W. McDUFFIE
BY
ATTORNEY April 3, 1962 E. B. NOLT ETAL 3,027,825
SAFETY DEVICE FOR TIER NEEDLES
Filed Dec. 16, 1960 2 Sheets-Sheet 2
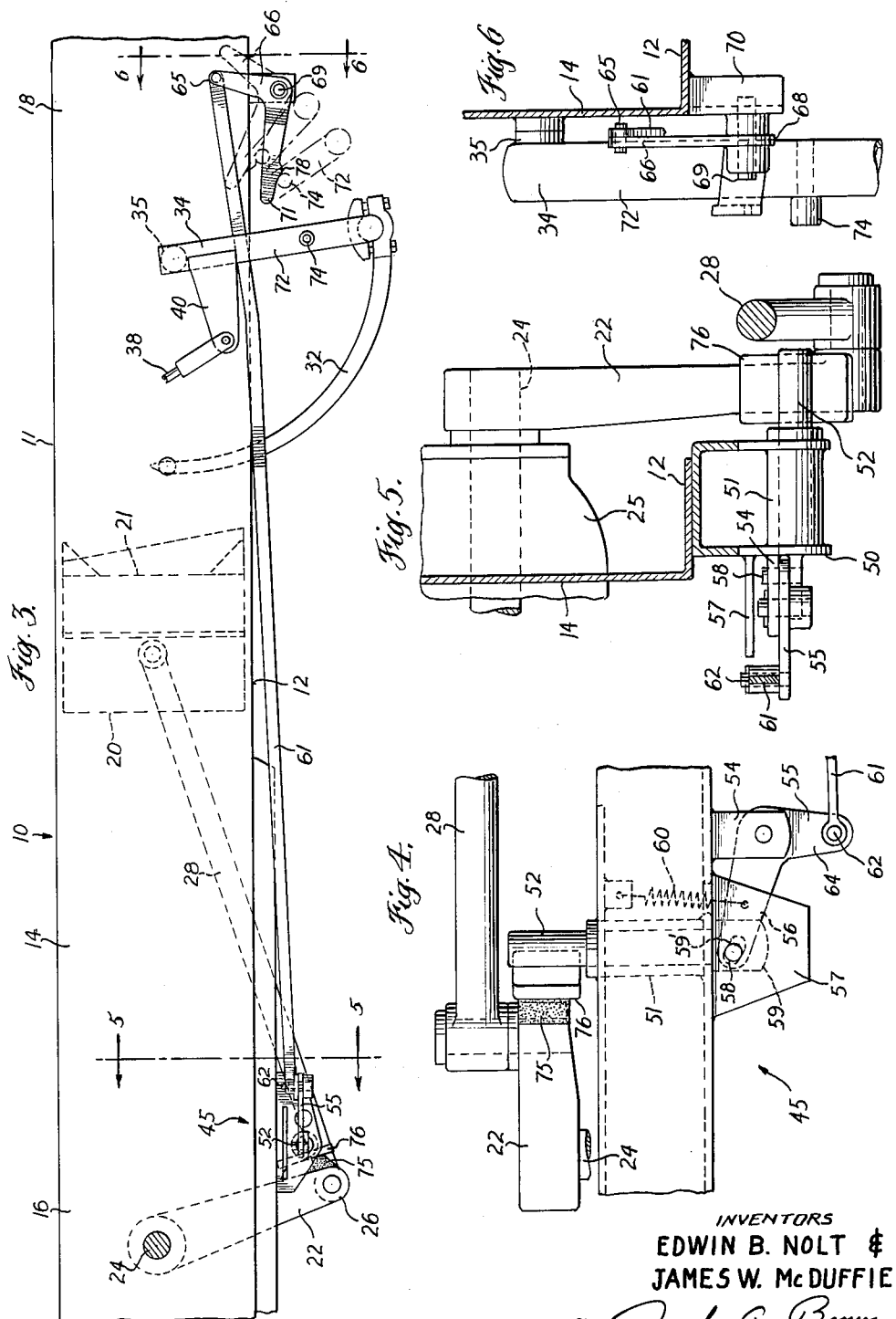
INVENTORS
EDWIN B. NOLT &
JAMES W. McDUFFIE
BY Joseph A. Brown
ATTORNEY United States Patent Office 3,027,825
Patented Apr. 3, 1962

3,027,825
SAFETY DEVICE FOR TIER NEEDLES
Edwin B. Nolt and James W. McDuffie, New Holland, Pa., assignors to Sperry Rand Corporation, New Holland, Pa., a corporation of Delaware
Filed Dec. 16, 1960, Ser. No. 76,207
7 Claims. (Cl. 100—19)

This invention relates generally to hay balers and more particularly to a safety device for a baler.

A hay baler has a bale case in which a plunger is reciprocable, being driven by a rotatable crank arm. Hay is delivered to the bale case in successive charges and each charge is compressed by the plunger. A plurality of charges produce a bale and when the bale is completed it is banded by a tying medium such as twine or wire. The tying medium is extended around the bale by needles which are projectable across the bale case. The needles are projected, retracted and a tying operation completed between working strokes of the plunger. Precise timing is required since the needles move across the path of travel of the plunger.

It sometimes happens that the drive mechanism for the tier needles breaks at a time when the needles are projected across the bale case. Instead of being retracted, they are left in the bale case and in the path of the plunger on its next working stroke. To prevent substantial damage to the baler, it is common to provide a safety member to stop the plunger if the needles are left in the bale case. Conventionally, such safety member is carried on the bale case and projectable between the plunger and the tier needles. It is moved into the path of travel of the plunger when the needles are across the bale case and it retracts out of the plunger path when the needles retract. Thus, if the needles are in the bale case when the plunger moves on a working stroke, the working face of the plunger will engage the safety member, causing the plunger movement to be arrested. To prevent the plunger drive from being damaged, a shear bolt is provided which breaks if the plunger is stopped during a working stroke.

While safety devices of the above type have substantial utility, they have a disadvantage in that they sometimes cause damage to the plunger. The safety member is supported on one side wall of the bale case and projects only a short distance into the bale case when the needles are extended. It is only a lateral edge of the plunger which strikes the safety member when a stopping action occurs and as a result the plunger is subjected to shock forces tending to twist the plunger. This is because the plunger-safety member engagement is spaced from the longitudinal center line of the plunger movement.

One object of this invention is to provide a safety device in a baler which will operate to stop a plunger without subjecting the plunger to twisting loads and resulting damage.

Another object of this invention is to provide a plunger safety device which operates in such a manner that the stopping of the plunger is cushioned and shock loads are absorbed.

Another object of this invention is to provide a plunger safety device in which the shock loads developed on stopping of the plunger are absorbed symmetrically in the structure taking such loads.

A further object of this invention is to provide means in a safety device of the character described for controlling and smoothing out the movements of the safety member of the device.

Other objects of this invention will be apparent hereinafter from the specification and from the recital in the appended claims.

In the drawings:

FIG. 1 is a fragmentary generally diagrammatic side elevational view of the bale case portion of a hay baler having mounted thereon a safety device constructed according to this invention, a plunger of the baler being shown during a working stroke and needles of the baler retracted;

FIG. 2 is a plan view taken generally on the lines 2—2 of FIG. 1 looking in the direction of the arrows;

FIG. 3 is a side view similar to FIG. 1 showing the needles partially projected across the bale case and the safety device operating to stop the plunger on a working stroke;

FIG. 4 is an enlarged fragmentary plan view showing the safety device and associated parts as illustrated in FIG. 3;

FIG. 5 is an enlarged fragmentary section taken on the line 5—5 of FIG. 3 looking in the direction of the arrows; and FIG. 6 is a section taken on the line 6—6 of FIG. 3 looking in the direction of the arrows.

Referring now to the drawings by numerals of reference, 10 denotes a bale case having a top wall 11, a bottom wall 12 and side walls 14 and 15. Bale case 10 is generally rectangular in cross section; it has a forward end 16 and a rear end 18. Hay is delivered to the bale case by a suitable feeder mechanism, not shown. The hay is deposited in front of a plunger 20 having a working face 21. During each operating cycle, plunger 20 moves from a position adjacent the forward end 16 of bale case 10 toward the rear end 18, and then returns. The plunger is moved rearwardly on a working stroke and then retracted forwardly on a return stroke by a crank arm 22 rotatably mounted on a drive shaft 24 projecting from a gear box 25 (FIG. 5). The crank arm 22 extends radially of shaft 24 and has an outer end 26 to which one end of a connecting rod 28 is pivotally connected. The opposite end of the connecting rod is pivotally connected to plunger 20. Crank arm 22 rotates as indicated by the arrow 29 in FIG. 1.

Hay is delivered to the bale case 10 in successive charges and each charge is compressed by the plunger 20. When a bale is completed, it is banded with a tying medium and tied. The mechanism for tying the bales is denoted at 30 in FIG. 1. Such mechanism is mounted on the top wall 11 of the bale case and includes a timer shaft 31 which rotates one revolution during each tying cycle. The tying medium is projected around the completed bale by needles 32, there being one needle for each band around the bale. In the present instance, three needles are shown. The needles 32 are carried on a yoke 34 which straddles the bale case and is pivotally connected to the sides 14 and 15 by suitable pivots 35. The top and bottom walls 11 and 12 of the bale case have longitudinal slots 36 through which the needles 32 are adapted to pass. The needle yoke 34 is adapted to be pivoted by a link 38 pivotally connected at 39 to an arm 40 extending from the yoke 34. The opposite end of link 38 is pivotally connected at 41 to a crank arm 42 connected to timer shaft 31. When the timer shaft 31 rotates one revolution, the crank arm 42 rotates with it causing the link 38 to be pulled upwardly from its normal at-rest position (FIG. 1) and then pushed downwardly. This causes the yoke 34 to pivot about the pivots 35 and first project the needles across the bale case and then return them to the at-rest position shown in FIG. 1. In FIG. 3, the needles are shown partially projected across the bale case.

The reciprocation of plunger 20 and the rotation of timer shaft 31 are precisely timed so that the needles 32 are projected across the bale case and then retracted between successive working strokes of the plunger 20. However, the drive mechanism for the needles might break and leave the needles projected across the bale case. In such case the plunger would strike the needles on the next working stroke. To protect against this, a safety device 45 is provided and will now be described.

Connected to the bottom wall 12 of bale case 10 is a U-shaped bracket 50, the legs of which project downwardly. Bracket 50 is mounted on the bale case between the crank arm 22 and plunger 20 in extended position. Bracket 50 carries a sleeve 51 the axis of which is transverse to the reciprocations of the plunger and in which a stop element or pin 52 is reciprocable. Pin 52 is normally disposed in a retracted position as shown in FIG. 2, wherein it is out of the plane of rotation of the crank arm 22. However, the pin is projectable into the path of the crank arm when the needles 32 are projected across the bale case. Adjacent and rearwardly of stop pin 52 is a bracket 54 which pivotally supports a bell crank 55. One leg 56 of the bell crank has a pivot pin 58 connected to a plate 59 affixed to an outer end of stop pin 52. A slot 59' is provided in the plate 59 to provide a lost motion connection between the bell crank and stop pin 52. A protective plate 57 is welded to bracket 50 and overlies the connection of bell crank 55 to pin 52. A spring 60 is interconnected between the leg 56 of bell crank 55 and bale case 10 to continuously urge the stop pin 52 to a position wherein it projects into the plane of rotation of crank arm 22.

Stop pin 52 is normally held retracted as shown in FIG. 2 by a control rod 61 which extends longitudinally of the baler along the corner of the bale case formed by side wall 14 and bottom wall 12. Control rod 61 extends rearwardly and past the yoke 34 for the needles 32. The forward end of the control rod is pivotally connected at 62 to a leg 64 of bell crank 55. The rearward end of the control rod is pivotally connected at 65 to one leg 66 of a bell crank 68. Bell crank 68 is pivotally mounted on a pin 69 (FIG. 6) supported on a bracket 70 depending from the bottom wall 12 of the bale case 10. The other leg 71 of bell crank 68 extends adjacent arm 72 of the yoke 34. Arm 72 carries a roller 74 engageable with leg 71. The engagement of roller 74 with leg 71 when the needles 32 are retracted causes bell crank 68 to be pivoted to assume a position as shown in FIG. 1 wherein control rod 61 holds safety pin 52 in a retracted position as shown in FIG. 2. However, when a bale is completed and the needles are moved to a position wherein they project across the bale case, as indicated in FIG. 3, roller 74 is moved out of engagement with leg 71 of bell crank 68. The hold on bell crank 55 is released and spring 60 is operative to project stop pin 52 across the path of travel of the crank arm 22. As bell crank 55 is pivoted, control rod 61 is shifted forwardly.

In normal operation, pin 52 will be projected into the path of crank arm 22 when needles 32 are projected across the bale case. When the needles retract, the roller 74 will engage crank arm leg 71 and pivot bell crank 68 clockwise. Control rod 61 will be shifted rearwardly, thereby pivoting bell crank 55 against the resistance of the spring 60 and retracting pin 52. The needles are projected across the bale case and retracted therefrom between working strokes of the plunger 20. In like respect, pin 52 is projected into and then out of the plane of rotation and path of travel of the crank arm 22 between revolutions thereof.

If the drive mechanism for the needles breaks and the needles are left in a position projected across the bale case, the pin 52 will remain in the path of the crank arm 22 on the next working stroke of plunger 20. In such event, the crank arm will strike the stop pin 52 and thereby the reciprocation of the plunger 20 will be stopped. A shear bolt, not shown, is provided in the drive train to the crank arm 22 which will break when a stopping action occurs. This will prevent damage of the driving mechanism to the crank arm. Since the plunger will be stopped on its working stroke, it will not come into engagement with needles 32 thereby preventing damage to the needles and the tying mechanism.

The stop pin 52 is so located that it engages the outer end 26 of the crank arm 22 and as shown best in FIGS. 3–5. The pin projects completely across the width of crank arm 22 and the shock loads resulting from a stopping of the plunger 20 are equally distributed about the supporting structure. It will be apparent that no twisting or other forces are directed to the plunger 20, as occur when the stopping of the plunger results from a stop member engaging a lateral edge of the front face 21 of the plunger.

A resilient pad 75 is mounted on the outer end of crank arm 22 to cushion the engagement with safety or stop pin 52. Pad 75 is preferably made of hard rubber or the like. It is covered by a flat plate 76 to protect the pad and prevent it from being destroyed when a stopping action takes place.

As previously stated, when timer shaft 31 rotates one revolution, the needles 32 are projected across bale case 10 from an at-rest position as shown in FIG. 1 and then return. At the last portion of a return stroke, the needles oscillate slightly as link arm 38 passes from one side to the other side of a straight line position between the axis of shaft 31 and the center of pivot 39. Since roller 74 is in engagement with leg 71 of bell crank 68 at this time, bell crank 68 is normally oscillated. This would be transmitted through control rod 61 and bell crank 55 to safety pin 52, causing pin 52 to be oscillated as it is retracted. To minimize such oscillation of pin 52, a protuberance 78 is provided on the leg 71 of the bell crank 68 for engagement with the roller 74. As shown in FIG. 3, when the needle yoke 34 retracts, the roller 74 engages the outer end of the leg 71 of the crank arm 68. As the needle yoke moves towards fully retracted position, the roller 74 moves along the leg 71. When it passes over protuberance 78 the speed of pivoting of the bell crank 68 is different than would occur if the edge of leg 71 were straight. Protuberance 78 provides a means for balancing out and rendering more smooth the pivoting of bell crank 68 and thus the reciprocations of the stop pin 52.

By removing the safety device from direct engagement with the plunger 20, the plunger is protected from shock loads tending to twist it, as occurs when the plunger is stopped by a stop which engages one lateral edge of the plunger face. The stopping of the plunger, by providing a safety device interposed between the crank arm and the plunger and by physically engaging the crank arm rather than the plunger, protects the structure from damage. A symmetrical arrangement is provided which gives a better distribution of the shock loads on a stopping operation. Resilient pad 75 cushions the stopping action and protuberance 78 smooths out the reciprocation of the stop pin 52.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains and as fall within the scope of the invention or the limits of the appended claims.

Having thus described our invention, what we claim is:

1. In an automatic hay baler, a bale case, a plunger reciprocable in said bale case on working and return strokes, needle means projectable across said bale case between working strokes of said plunger and across the path of travel of the plunger, a rotatable crank arm reciprocating said plunger in timed relation with said needle means, and means for stopping said plunger if the timing between the plunger and said needle means is disrupted and the plunger moves on a working stroke when said needle means is in a position projected across said bale case, said stopping means comprising a stop pin mounted on said bale case for reciprocal movement transverse to the reciprocation of said plunger, said pin being movable from a retracted position outside the path of rotation of said crank arm to an extended position in the path of rotation, spring means biasing said pin toward extended position, first and second bell cranks pivotally mounted on said bale case, means connecting said first bell crank to said pin, means for pivoting said second bell crank responsive to operation of said needle means, and means connecting said bell cranks.

2. In an automatic hay baler, a bale case, a plunger reciprocable in said bale case on working and return strokes, needle means projectable across said bale case between working strokes of said plunger and across the path of travel of the plunger, a rotatable crank arm reciprocating said plunger in timed relation with said needle means, and means for stopping said plunger if the timing between the plunger and said needle means is disrupted and the plunger moves on a working stroke when said needle means is in a position projected across said bale case, said stopping means being operable responsive to projection of said needle means and comprising means engageable with said crank arm to stop the rotation of the crank arm and thereby the reciprocation of said plunger, and cushion means interposed between said engageable means and said crank arm.

3. In an automatic hay baler, a bale case, a plunger reciprocable in said bale case on working and return strokes, needle means projectable across said bale case between working strokes of said plunger and across the path of travel of the plunger, a rotatable crank arm reciprocating said plunger in timed relation with said needle means, said crank arm rotating in a plane parallel to the reciprocation of said plunger, and means for stopping said plunger if the timing between the plunger and said needle means is disrupted and the plunger moves on a working stroke when said needle means is in a position projected across said bale case, said stopping means comprising a stop element mounted on said bale case and movable into said plane of rotation of said crank arm in a position for engagement therewith when said needle means is projected across said bale case and out of the plane of rotation of the crank arm when the needle means is not projected across said bale case, and cushion means interposed between said stop element and said crank arm to absorb shock loads on engagement of the parts.

4. In an automatic hay baler as recited in claim 3 wherein said cushion means comprises a resilient pad mounted on said crank arm and covered by a protective plate.

5. In an automatic hay baler as recited in claim 3 wherein said stopping means is connected to said needle means and said stop element is projected into and then out of the plane of rotation of said crank arm responsive to projection of said needle means.

6. In an automatic hay baler as recited in claim 5 wherein the connection between said stopping means and said needle means includes means for controlling the speed of movement of said stopping means.

7. In an automatic hay baler, a bale case, a plunger reciprocable in said bale case on working and return strokes, needle means projectable across said bale case between working strokes of said plunger and across the path of travel of the plunger, a rotatable crank arm reciprocating said plunger in timed relation with said needle means, said crank arm rotating in a plane parallel to the reciprocation of said plunger, and means for stopping said plunger if the timing between the plunger and said needle means is disrupted and the plunger moves on a working stroke when said needle means is in a position projected across said bale case, said stopping means comprising a stop element engageable with said crank arm, means mounting said stop element on said base case for movement relative thereto from a retracted position outside the plane of rotation of said crank arm to an extended position in the plane of rotation, and means connecting said needle means to said stop element to move the stop element responsive to operation of the needle means.

References Cited in the file of this patent

UNITED STATES PATENTS

| 2,622,507 | Hitchcock et al. | Dec. 23, 1952 |
| 2,651,252 | Pope | Sept. 8, 1953 |
| 2,882,813 | Nelson et al. | Apr. 21, 1959 |
| 2,957,407 | Vutz et al. | Oct. 25, 1960 |